Figure 1:
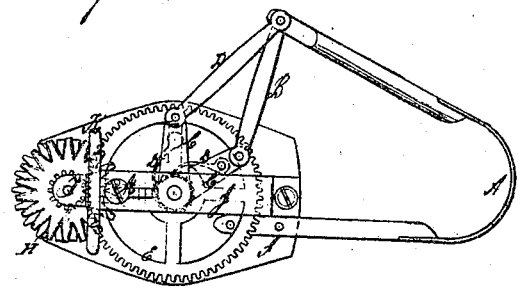
Figure 2:
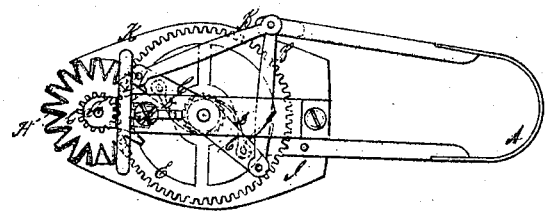
Figure 3:
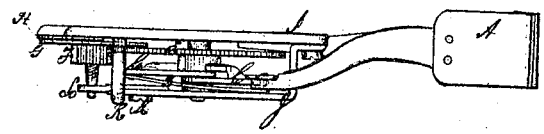

T. M. Wilder,

Sheep Shears.

No. 14,840.  Patented May 6, 1856.

UNITED STATES PATENT OFFICE.

ROBERT M. WILDER, OF COLDWATER, MICHIGAN.

SHEEP-SHEARS.

Specification of Letters Patent No. 14,840, dated May 6, 1856.

*To all whom it may concern:*

Be it known that I, ROBERT M. WILDER, of Coldwater, in the county of Branch and State of Michigan, have invented a new and useful method or machine for shearing sheep or clipping the wool therefrom and that may be applied to any purpose for which shears may be used; and I do hereby declare that the following is a full, clear, and exact description of the said invention, its construction, and operation when combined, reference being had to the annexed drawings, making part of this specification.

Letter "A," represents the spring forming the handle; "B," "B," the coupling rods, uniting one end of the spring handle to the levers "C," "C," forming, with springs "D," "D," or dogs and springs meshing into spur wheel on main driving wheel shaft, the crank, the other end of handle being firmly fastened to bed piece or plate "I".

"E," represents main driving wheel meshing into spur wheel "F," on same spindle with wheel "G," and driving wheel "G," when machine is in motion. Wheel "G," may be of any desirable size.

Letter "G," represents a wheel on the outer edge or periphery of which notches are cut in such manner as to form with plate "H" shears, knives or cutters. Plate "H," is stationary and "G," moves with a circular or rotary motion.

"I," "J," "K," represents the frame; "L," a movable plate fastened on the under side of forward end of frame "J," by means of thumb screw "M," to govern half shear or cutter "G".

By moving the handle "A," in the same manner as the ordinary spring handle shears, the machinery is set in motion, giving a circular motion to cutter "G".

The machine may be constructed of any material in each and all its parts that will answer the desired end. The size of the wheels, are not important—the object being to get motion enough to clip the wool or other material.

I do not claim operating the shears by the grasp of the hand, as this has been done, but

I claim—

The rotary cutter in combination with the spring handle A, coupling rods B, levers C, spring pawls D, spur wheel F, and wheels connecting spur wheels with cutter wheel; or equivalents thereof, arranged and operating substantially as and for the purposes set forth.

ROBERT M. WILDER.

Witnesses:
GEO. ILENE,
JAMES E. ABELL.